United States Patent [19]
Fischer et al.

[11] Patent Number: 5,453,116
[45] Date of Patent: Sep. 26, 1995

[54] SELF SUPPORTING HOT GAS FILTER ASSEMBLY

[75] Inventors: Edward M. Fischer, White Bear Lake, Minn.; Richard L. Bloom, Woodville, Wis.; Stephen M. Sanocki, Stillwater, Minn.; Joel H. Sabean, Hudson, Wis.

[73] Assignee: Minnesota Mining and Manufacturing Company, Saint Paul, Minn.

[21] Appl. No.: 258,675

[22] Filed: Jun. 13, 1994

[51] Int. Cl.⁶ .................... B01D 29/25; B01D 35/16; B01D 46/04
[52] U.S. Cl. .................... 95/278; 95/283; 55/341.2; 55/486; 55/503; 55/527; 55/DIG. 5; 55/DIG. 10; 55/DIG. 30
[58] Field of Search ............. 95/278, 288, 287; 55/341.1–341.7, 486, 487, 495, 498, 503, 505, 511, 516, 519, 527, DIG. 5, DIG. 10, DIG. 30; 210/493.2, 497.01

[56] References Cited

U.S. PATENT DOCUMENTS

| | | | |
|---|---|---|---|
| 1,639,133 | 8/1927 | Greene | 55/498 |
| 3,100,190 | 8/1963 | Hobson, Jr. | 55/341.1 X |
| 3,407,572 | 10/1968 | Tolley | 55/341.1 X |
| 3,535,852 | 10/1970 | Hirs | 55/341.1 X |
| 3,540,190 | 11/1970 | Brink, Jr. | 95/278 |
| 3,708,965 | 1/1973 | Domnick | 55/498 X |
| 3,853,508 | 12/1974 | Gordon et al. | 55/341.1 X |
| 3,992,177 | 11/1976 | Welteroth | 55/498 X |
| 4,073,632 | 2/1978 | Reinauer et al. | 55/341.1 X |
| 4,251,238 | 2/1981 | Claes et al. | 95/278 |
| 4,270,935 | 6/1981 | Reinauer | 55/341.1 X |
| 4,348,362 | 9/1982 | Foss | 55/DIG. 10 |
| 4,398,931 | 8/1983 | Shevlin | 55/341.1 |
| 4,477,771 | 10/1984 | Nagy et al. | 324/58.5 C |
| 4,519,102 | 5/1985 | Efstratis | 210/497.01 X |
| 4,829,766 | 5/1989 | Henkel | 55/DIG. 30 |
| 4,912,920 | 4/1990 | Hirabayashi | 60/303 |
| 4,934,141 | 6/1990 | Oilivoa et al. | 60/275 |
| 4,940,476 | 7/1990 | Buck | 55/486 |
| 5,058,381 | 10/1991 | Christenson et al. | 55/DIG. 30 |
| 5,087,272 | 2/1992 | Nixdorf | 55/96 |
| 5,098,455 | 3/1992 | Doty et al. | 55/523 |
| 5,165,887 | 11/1992 | Ahmady | 431/329 |
| 5,174,969 | 12/1992 | Fischer et al. | 55/486 X |
| 5,180,409 | 1/1993 | Fischer | 55/486 |
| 5,190,571 | 3/1993 | Fay et al. | 55/523 |
| 5,195,317 | 3/1993 | Nobue et al. | 60/275 |
| 5,196,120 | 3/1993 | White | 210/504 |
| 5,205,850 | 4/1993 | Jenrich et al. | 55/DIG. 10 |
| 5,224,973 | 7/1993 | Hoppenstedt et al. | 55/DIG. 30 |
| 5,228,891 | 7/1993 | Adiletta | 55/DIG. 30 |
| 5,248,481 | 9/1993 | Bloom et al. | 422/171 |
| 5,248,482 | 9/1993 | Bloom | 55/484 X |
| 5,258,164 | 11/1993 | Bloom et al. | 422/174 |
| 5,298,046 | 3/1994 | Peisert | 55/486 |
| 5,300,223 | 4/1994 | Wright | 210/232 |

FOREIGN PATENT DOCUMENTS

0212396 10/1989 European Pat. Off. .

Primary Examiner—Robert Spitzer
Attorney, Agent, or Firm—Gary L. Griswold; Walter N. Kirn; James J. Trussell

[57] ABSTRACT

A device and method for maintaining a clean gas stream includes a particulate filter comprising of support tube made from a formed textile. The formed textile is constructed from a continuous filament inorganic yarn and is porous to allow gas and particulates therein to pass through the support tube. A filtering element is disposed about the support tube to trap particulates in the exhaust gas. The formed textile which defines the support tube is relatively flexible in its natural state. To act as a supporting structure, the formed textile is made less flexible by the application of an inorganic binder. The natural flexibility of the formed textile minimizes the damaging effects of mechanical and thermal shock, while the inorganic binder stiffens the formed textile and allows the support tube to support itself and the filtering element thereon.

32 Claims, 3 Drawing Sheets

SELF SUPPORTING HOT GAS FILTER ASSEMBLY

BACKGROUND OF THE INVENTION

This invention relates generally to filters for the removal of particulate matter from gas streams, and more particularly to a filter suitable for regeneration by exposure to microwave energy. While this application discusses the present invention in the context of a diesel engine exhaust filter, the invention is easily adaptable to filter particulates from other types of gas streams.

Diesel engines emit a hazardous, sooty exhaust that can be rendered less hazardous by using diesel particulate filters. The filters trap soot particles emitted by an engine and thereby prevent the particles from entering the atmosphere. However, the soot trapped by such filters builds up over time. As soot builds up in the filter, the effectiveness of the filter decreases, an increased pressure drop occurs across the filter, and the engine experiences an increased exhaust gas back pressure which decreases engine performance. Therefore, a clogged filter must periodically be either replaced or regenerated. Depending upon the speed with which the filter fills with soot particles, replacement of clogged filters is inconvenient and expensive. Therefore, periodic regeneration of the filter (i.e., removal of the trapped soot) is the preferred method of maintaining a clean filter.

There are several techniques for regenerating diesel particulate filters. The methods typically involve igniting the trapped soot particles in the filter and thereby burning the soot out of the filter. One technique involves the periodic release of a burning gas into the filter, as disclosed in U.S. Pat. No. 4,912,920 to Hirabayashi. Another technique utilizes electrical heating elements in contact with the filtering elements. An electrically regenerable filter is illustrated in U.S. Pat. No. 5,258,164 to Bloom, et al. Yet a third technique utilizes microwave energy to heat the filter and cause the particulates trapped in the filter to ignite and burn, thereby regenerating the filter. An example of the latter technique is disclosed in U.S. Pat. No. 5,087,272 to Nixdorf, wherein the regenerable particulate filter structure uses a monolithic filter element fabricated from silicon carbide whiskers capable of converting microwave energy to thermal energy.

Filter assemblies regenerated by a burning gas additive or electrical resistance heating typically use metallic structures to support the filtering element or to provide resistance heating. A perforated metal tube, screen, coiled wire, or similar structure is often used to provide support to a filtering element. For example, U.S. Pat. No. 5,258,164 to Bloom, et al. discloses an electrically resistive expanded metal sleeve 21 positioned between an inner filter element 20 and an outer filtering element 22 which is used to heat and thereby regenerate the filtering elements 20, 22.

However, a particulate filter regenerated by heating the filter with microwave energy must not contain any metallic components, because metallic components interfere with the microwave energy. Metals are also poor microwave susceptors and thus do not tend to heat up when exposed to microwave energy. Therefore, filters using microwave energy for regeneration must be formed from microwave compatible materials. The materials may be microwave susceptors which heat when exposed to microwave energy. It is not required, however, that a material which is a microwave susceptor be used. A microwave transparent material which does not interact at all with microwave energy is also suitable. Inorganic materials, such as glass or ceramic, are often the materials of choice, as they can be designed to assume a wide variety of forms. For example, ceramic materials may range in form from large solid bodies which are machined (if necessary) into the shape of the finished product to small flexible fibers which may be formed into thread or yarn-like material.

When using ceramic materials, numerous filter configurations are possible. Known filter assemblies may simply be modified by substituting ceramic materials for components previously made of metal. For example, a perforated cylinder could be formed of a ceramic material and used in place of a similar metallic component to support a filtering element. Alternatively, a monolithic ceramic filter may be formed. One type of monolithic filter is a "wall flow" filter where the gases are filtered by passing from one passage way through a thin ceramic membrane into an adjacent passageway (typically in the form of a honeycomb). Yet another type of monolithic ceramic filter is referred to as a "foam" filter where the gas is filtered during passage through a body having some selected porosity, thereby capturing any particles larger than the "pores" of the foam. In each of the above filter configurations, ceramic components are used to provide a rigid supporting structure to the filter, thereby eliminating the need for any metallic components.

Using ceramic filters or ceramic filter components as a supporting structure of a filter has several disadvantages. Specifically, ceramic materials, especially when formed as structures such as monolithic filters, are typically rigid and susceptible to cracking from either mechanical or thermal shock. The brittle ceramic components are unable to respond to stresses due to their brittle nature in a manner similar to metal components without experiencing cracking, either at a microscopic or a macroscopic level. This characteristic can be problematic with ceramic components used in applications which experience a great deal of vibration, such as on vehicles and running engines. The continuous vibrations can cause microscopic cracks in the ceramic material which grow over time and eventually lead to complete failure, i.e. breaking, of the component. A similar result occurs when the ceramic material is exposed to rapid thermal expansion or contraction. For example, in a regenerable filter, a sharp thermal gradient is created across the filter by the burning of the soot within the filter. As the filter components expand and contract in response to the changing temperatures, cracking of the ceramic material often results. The cracking of the ceramic material is especially problematic in filter assemblies which utilize inflexible ceramic components for support structures or as monolithic filters. In such filters, failure of the ceramic component typically results in the failure of the entire filter assembly.

A need thus exists for a microwave regenerable filter assembly which is resistant to failure due to mechanical and thermal shock, and which is easy to manufacture at a low cost.

SUMMARY OF THE INVENTION

The present invention is a device and method for maintaining a clean gas stream. The invention includes a particulate filter comprising a support tube made from a formed textile, such as a braided, knitted or woven textile. The formed textile, which is constructed from a continuous filament inorganic yarn, is porous to allow a gas and particulates therein to pass through the support tube. A filtering element is disposed about the support tube to trap particulates in the exhaust gas.

The hot gas particulate filter of the present invention is relatively uncomplicated. The formed textile which defines the support tube is relatively flexible in its natural state. To act as a support structure, the formed textile can be substantially rigidized by the application of an inorganic binder such as a colloidal silica solution. The inherent flexibility of the formed textile minimizes the damaging effects of mechanical and thermal shock, while the inorganic binder solution applied to the formed textile makes the textile less flexible and allows the support tube to support itself and a filtering element thereon to trap particulates in the exhaust gas. The filtering element may be formed from several different materials, including non-woven materials, woven fabrics, or yarns or rovings wound about the support tube. The materials forming the filtering element may also be texturized to improve their filtering ability. For mounting in an exhaust system, the filter assembly is secured by at least one end cap fixture which clamps at least one end of the filter assembly about its circumference. The end cap further serves to direct the exhaust gases through the circumferential walls of the filter assembly, thereby removing particulates from the exhaust gas.

While the above-identified drawings features set forth preferred embodiments, this disclosure presents illustrative embodiments of the present invention by way of representation and not limitation. It should be understood that numerous other modifications and embodiments can be devised by those skilled in the art which fall within the scope and spirit of the principles of this invention.

DETAILED DESCRIPTION OF THE PREFERRED EMBODIMENTS

The present invention provides an efficient filter assembly suited for regeneration (i.e., burning out the collected soot). The present invention is particularly suited for regeneration by exposure to microwave energy. Because the filter of the present invention is comprised of inorganic components which will not reflect microwaves, microwave energy is used to couple with the soot collected on the filter and burn it off. Electrical resistance heaters, and fuel burners are also useful in burning off the soot collected in the filter assembly of the present invention. A catalytic fuel additive may be added to either to lower the oxidation temperature. Examples of the catalytic fuel additives include ferrocene, such as commercially available from Chemische Betriebe Pluto GmbH, Herne, Germany; copper compounds in a liquid suspension, commercially available from Lubrizol Corporation, Cleveland, Ohio, or cerium, such as in a liquid suspension, commercially available from Rhone Poutenc, Paris, France.

In the description of the present invention and in the claims, the following terms are intended to have the meanings defined below:

"inorganic fiber" refers to any inorganic-based fiber which is resistant to high temperature (e.g. temperature above approximately 600° C.), is chemically resistant to diesel exhaust gas, and has textile qualities (i.e., is suitable for making into a yarn or fabric which can be made into the support tube or can be wound or wrapped around the support tube);

"tow" means a plurality or bundle of individual fibers or filaments;

"yarn" means a plurality or bundle of individual fibers or filaments which have been twisted together;

"continuous filament inorganic yarn" refers to any inorganic-based yarn which is resistant to high temperatures (e.g. temperatures above approximately 600° C.) and which is sufficiently long to wrap around the circumference of the support tube at least once; preferably the continuous yarn is at least 25 cm long and, more preferably, at least 1 meter long;

"formed textile" refers to continuous filament inorganic yarns or tows which have been braided, knitted, woven or filament-wound;

"porous" refers to the open structure of the formed textile; the total open area of the formed textile ranges from 40 percent to 80 percent;

"self-supporting" refers to a structure which is sufficiently stiff to maintain a predetermined shape and to additionally support a filtering medium about the structure; the structure may retain some flexibility but still be self-supporting;

"rigidized" means to make a structure less flexible such that it becomes self-supporting.

Figure 1:
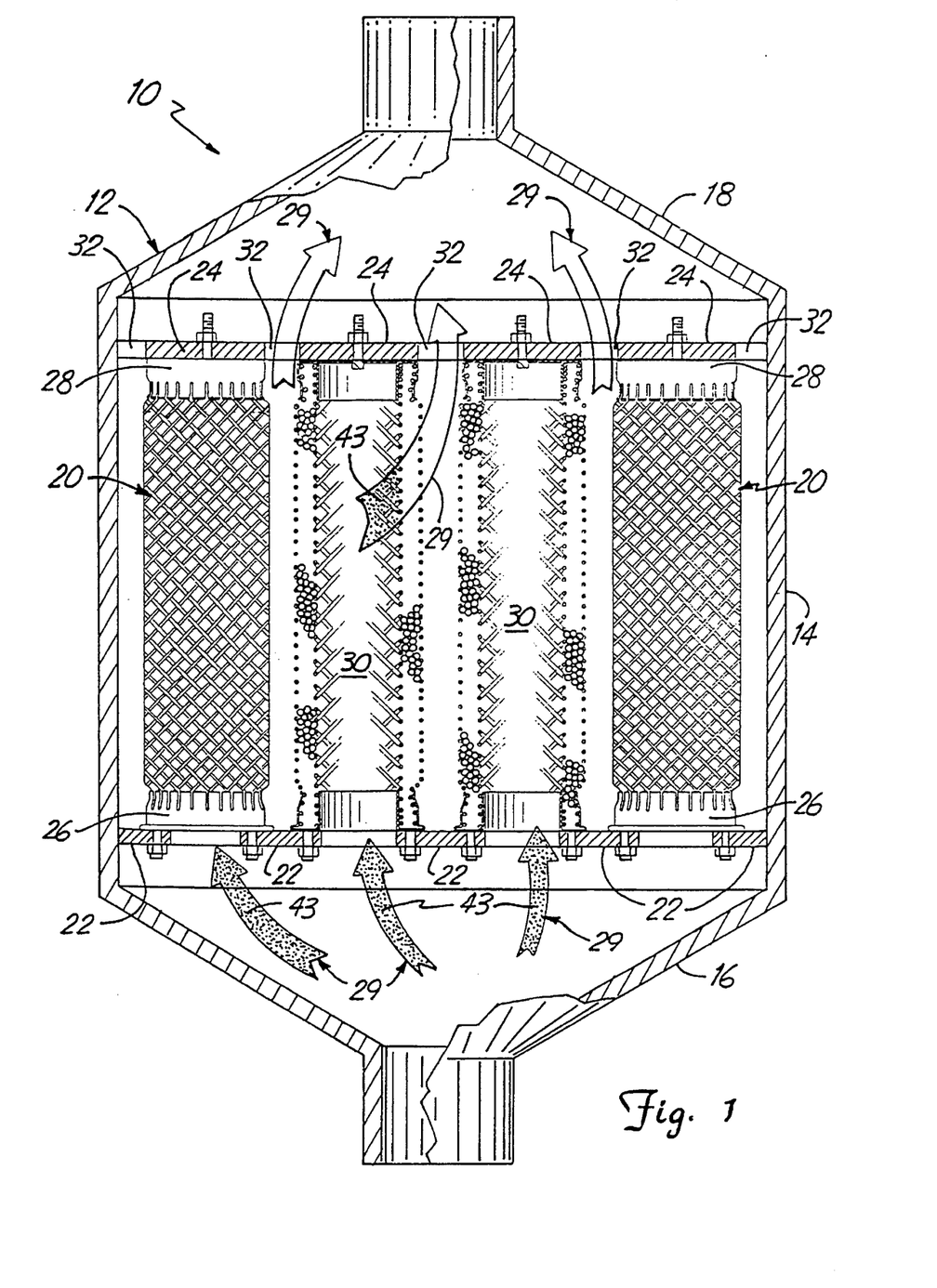
FIG. 1 is a partial sectional view through a particulate trap of the invention.

Referring to FIG. 1, a diesel particulate trap 10 includes a casing 12 comprising a cylindrical body 14, an exhaust conical inlet 16, and an exhaust conical outlet 18. Within the cylindrical body 14 are a plurality of parallel, side-by-side, filter assemblies 20, each of which is open adjacent the exhaust conical inlet 16 and blocked adjacent the exhaust conical outlet 18. The filter assemblies 20 extend between an end wall 22 adjacent exhaust conical inlet 16 and an end wall 24 adjacent the exhaust conical outlet 18. The filter assemblies 20 are connected to the end wall 22 and the end wall 24 by an open end cap 26 and a closed end cap 28, respectively.

The end wall 22 and the end wall 24 are connected to the cylindrical body 14 and aid in directing an exhaust gas 29 through the filter assemblies 20. End wall 22 blocks the spaces between adjacent filter assemblies 20 such that exhaust gas 29 (see arrows 29 in FIG. 1) entering the exhaust conical inlet 16 passes through open end cap 26 and into the interior 30 of the filter assemblies 20. The closed end caps 28 block the end of the filter assemblies 20 adjacent the end wall 24 and force the exhaust gas 29 to pass radially and outwardly through the filter assemblies 20 before exiting through unblocked spaces 32 in the end wall 24 adjacent the exhaust conical outlet 18. In an alternative embodiment, the exhaust gas 29 may be directed such that the exhaust gas 29 flows radially from the outside of the filter assembly 20 into the interior 30 of the filter assembly 20 and then out of an open end of the filter assembly 20.

Figure 2:
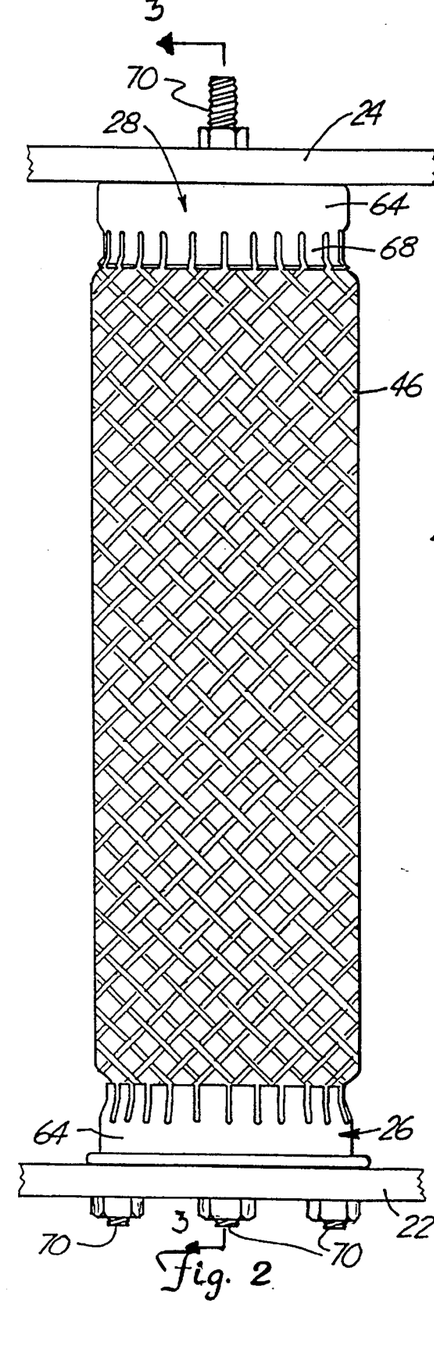
FIG. 2 is an elevational view of the filter assembly of the present invention.
Figure 3:
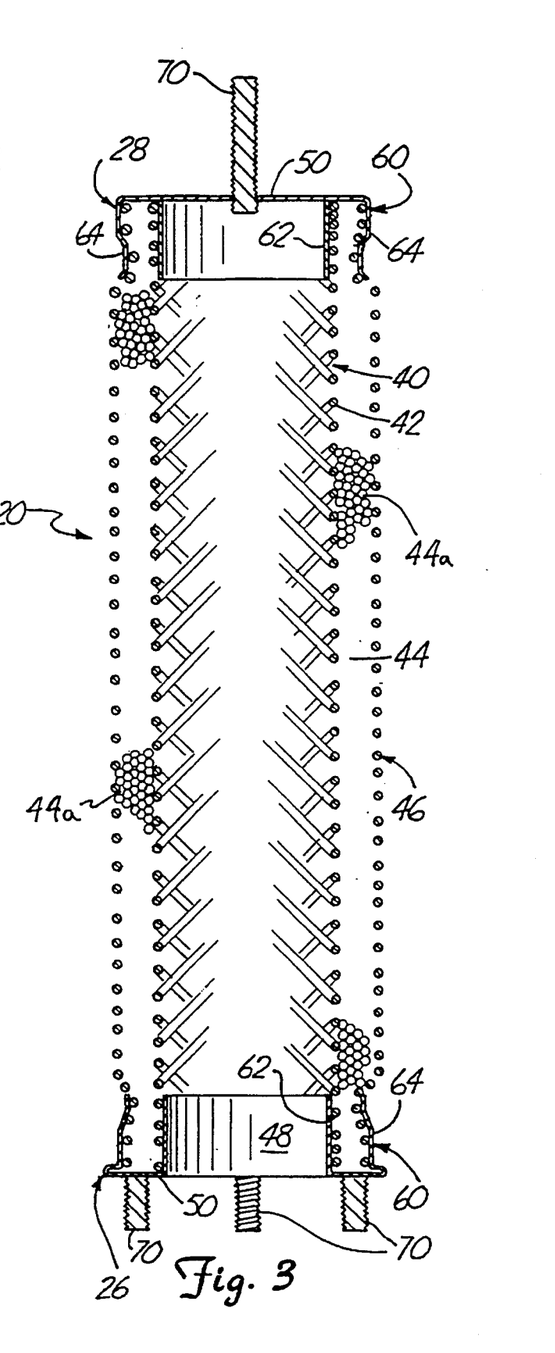
FIG. 3 is a sectional view of the filter assembly of FIG. 2 taken along line 3—3.

Referring now also to FIGS. 2 and 3, each of the filter assemblies 20 is assembled with the open end cap 26 and the closed end cap 28 as a cartridge. A support tube 40 is constructed from a formed textile 42. The formed textile 42 is preferably constructed from a continuous filament inorganic yarn and is porous enough to permit the exhaust gas 29 and particulates 43 carried by the exhaust gas 29 to pass unobstructed through the support tube 40. The formed textile 42 is preferably braided, knitted or woven and is flexible in its natural state.

To act as a support structure, the formed textile is preferably made less flexible ("rigidized") by the application of an inorganic binder such as a colloidal silica solution. The inorganic binder can be a clay suspension (e.g. bentonite) but is preferably a colloidal inorganic oxide in the form of a sol gel. A sol gel process is one which converts a colloidal dispersion, sol, organosol or hydrosol of a metal oxide or a precursor thereof to a gel. A gel is a material wherein one or more of the components are cross-linked either chemically or physically to such an extent to form a three-dimensional network. Sols useful in the practice of this invention include alumina sols, commercially available under the trade designation DISPERAL™ from Condea Chemie, GmbH of Germany, or CATAPAL D™ from Vista Chemical Company of Houston, Tex., zirconia sols, commercially available under the trade designation NYACOL™ Zr Series from Nyacol Inc. of Ashland, Mass., and silica sols commercially available from Nalco Chemical Company of Chicago, Ill. A preferred silica sol is NALCO 2327 from Nalco Chemical Company.

Typically, the formed textile is heated to about 600° C. Heating the formed textile to approximately 1000° C. can also be useful to sinter fibers together with the sol, thereby making the formed textile more rigid.

The natural flexibility of the formed textile 42 aids in minimizing the damaging effects of mechanical and thermal shock, while the inorganic binder applied to the formed textile 42 decreases the flexibility of the formed textile 42 enough to allow the support tube to maintain a predetermined shape and to support a filtering element 44 thereon to trap the particulates 43 carried by the exhaust gas 29. In this manner, the filter assembly 20 is self-supporting (i.e., is supported without the aid of an additional rigid structure). To apply an inorganic binder such as a colloidal silica solution, the formed textile 42 is wrapped about a mandrel to provide the desired shape for the support tube 40. The inorganic binder is then applied to the formed textile 42 and dried. In the case of a colloidal silica solution, the formed textile 42 is dipped into the colloidal silica solution and then dried by heating.

Alternatively, the formed textile 42 of the support tube 40 is not made less flexible, and the formed textile 42 remains in its naturally flexible condition. When the support tube 40 is not made less flexible, the filter assembly 20 is supported within the casing 12 by stretching the filter assemblies 20 between the end wall 22 and the end wall 24. The stretched support tube 40 then provides sufficiently stable support for a filtering element 44.

Referring to FIG. 3, the filter assembly 20 consists of the support tube 40, the filtering element 44, and an outer sleeve 46. The filtering element 44 is disposed about the surface of the support tube 40, and the porous sleeve 46, preferably a formed textile, covers the filtering element 44. The filter assembly 20 is secured to the end caps 26 and 28 to allow the filter assembly to be mounted in the casing 12. The open end cap 26 and the closed end cap 28 are secured to the filter assembly 20 in an identical manner, with the open end cap 26 having an orifice 48 in an end plate 50 to allow the exhaust gas to pass into the interior 30 of the filter assembly 20. The closed end cap 28 has a solid end plate 50 which blocks the passage of exhaust gas and forces the exhaust gas 29 radially through the filter assembly 20, as is shown in FIG. 1.

Each end cap 26 and 28 includes a U-shaped recess 60 with a first collar 62 and a second collar 64. The collars 62 and 64 are secured to the end plate 50. The second collar 64 contains a plurality of tabs 68 (FIG. 2) about its circumference. The filter assembly 20 is inserted between the first collar 62 and the second collar 64 and butted against the end plate 50. The tabs 68 on the second collar 64 are then deformed toward the first collar 62, thereby deforming the filter assembly 20 and clamping filter assembly 20 between the first collar 62 and the second collar 64 (see FIG. 3). Fastening bolts 70 are attached to the end plate 50 to allow the cartridge formed by the filter assembly 20 and the end caps 26, 28 to be attached to the casing 12. The fastening bolts 70 may be arranged in any desired pattern.

The support tubes 40 can comprise any suitable formed textile, such as a textile that is braided, knitted or woven, and the shape of the support tubes 40 can be any desired shape. The formed textile is preferably constructed from an inorganic yarn. Preferably, the inorganic yarn is a ceramic. The yarns from which the formed textile is constructed are preferably made of alumina-boria-silica, but other useful ceramic yarns include those made of alumina, silica, silicon carbide and zirconia. Alumina-boria-silica yarns are commercially available under the trademark designations NEXTEL 312 CERAMIC YARN and NEXTEL 440 CERAMIC YARN from the 3M Company of St. Paul, Minn. Alumina-silica yarns are commercially available under the trademark NEXTEL 550 CERAMIC YARN from 3M Company. Preferably, the support tubes 40 have a circular or elliptical cross-section. The formed textile which forms the support tube 40 preferably has perforations too large to trap any particles 43 in the exhaust gas 29. Preferably, the formed fabric which forms the support tube 40 has a permeability in the range of about 100 to about 1,000 standard cubic feet per minute (SCFM) per square foot (168.6 to 1686 normalized cubic meters per hour, i.e., $Nm^3/hr$).

Figure 4:
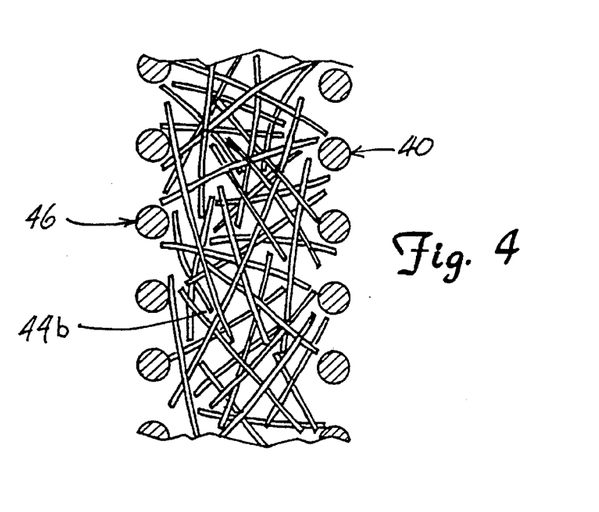
FIG. 4 is a sectional view of the filter assembly illustrating an alternative filtering element.
Figure 5:
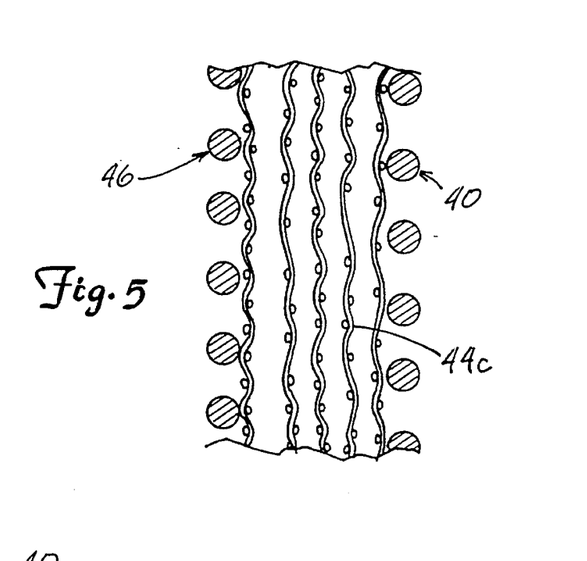
FIG. 5 is a sectional view of the filter assembly showing yet another alternative filtering element.
Figure 6:
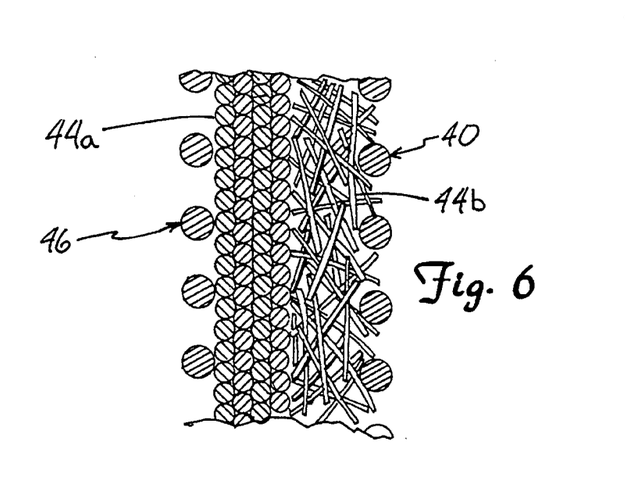
FIG. 6 is a sectional view of the filter assembly showing a combination of filtering elements.

The filtering element 44 may comprise several types of inorganic material. An inorganic yarn 44a may be substantially helically wound or cross-wound over the support tube 40 to provide the filtering element 44 (FIG. 3). Alternatively, the filtering element 44 may comprise a non-woven mat 44b (FIG. 4) or a woven fabric 44c (FIG. 5) wound about the support tube 40. Optionally, more than one type of filtering material may be combined to form the filtering element 44. For example, as seen in FIG. 6, a non-woven mat 44b may be interposed between the support tube 40 and an inorganic yarn 44a which is substantially helically wound or cross-wound over the non-woven mat 44b and support tube 40. Any other combination of filtering materials which produces the desired filtering performance may be used.

The inorganic material comprising the filtering element 44 may be glass fibers or ceramics, for example. The material comprising the filtering element 44 is preferably either a microwave transparent material which does not interact with microwave energy, or a microwave susceptor which heats when exposed to microwave energy. A microwave transparent material allows the microwave energy to penetrate the filtering element 44 to directly interact with and heat the trapped particulates 43 in the filtering element 44. A microwave susceptor material is itself heated by the microwave energy and, in turn, heats and ignites the trapped particulates 43 in the filtering element 44. In addition to being compatible with microwave regeneration of the filter assembly 20, microwave transparent materials and microwave susceptor materials are equally compatible with other methods of regeneration, such as heating by an electrical-resistance element, heating by fuel burners, or heating by catalytic fuel additives.

In a preferred embodiment of the present invention, the filtering element 44 is formed by an inorganic yarn substantially helically wound or cross-wound around the support tube 40 (FIG. 3). Examples of winding techniques of the inorganic yarn about the support tube 40 are found in U.S. Pat. No. 5,248,481 to Bloom, et al., describing a laterally offset winding procedure, and U.S. Pat. No. 5,248,482 to Bloom, et al., describing a radially aligned winding procedure. U.S. Pat. No. 5,248,481 and U.S. Pat. No. 5,248,482 are herein incorporated by reference.

In the lateral offset winding procedure, a continuous filament yarn which has been texturized to provide a plurality of loops of continuous fibers or fiber segments extending from the core of the yarn is substantially helically cross-wound around the support tube to form a plurality of layers of yarn. Successive convolutions of the yarn are oppositely wound in layers to provide interwoven cores. The cores of successive convolutions of each successive layer are spaced to define four-sided openings, with the loops of fibers or fiber segments on the texturized yarn projecting into each of the four-sided openings to provide a trap for particulates in the gas. The cores of the yarn in at least one layer are laterally offset from the cores of yarn in an adjacent layer to deflect the gas into a tortuous path through the filtering material.

The radially aligned winding procedure also uses a texturized continuous filament yarn which is cross-wound around the support tube. Successive convolutions of yarn are oppositely wound in layers to provide interwoven cores, with the cores of the successive convolutions of each layer radially aligned to provide walls that are spaced to define four-sided openings. The loops of fibers or fiber segments of the texturized yarn project into each of the four-sided opening to provide a trap for diesel exhaust particulates.

Preferably, the inorganic yarn wound or cross-wound over the support tube 40 has a diameter in the range from about 0.5 to about 5 mm. More preferably, the diameter is in the range from about 1 to about 3 mm. Such yarns are typically comprised in the range from about 780 to about 7,800 individual inorganic fibers. Preferably, the inorganic yarn comprises in the range from about 1,560 to about 4,680 individual fibers. Preferably, the inorganic yarn is ply-twisted because such construction can be texturized to provide a superior filtering material when compared to inorganic yarn which is not ply-twisted.

Texturization of the inorganic yarn improves its filter or trapping efficiency. Preferably, the inorganic yarn is texturized such that it is lofty, e.g., by being texturized so that loops of continuous fibers, individual fiber segments or a combination thereof extend outwardly from a dense core. Loops of continuous fibers are most preferred. The inorganic yarn can be texturized by techniques known in the art including, for example, air jet or mechanical texturization. Air jet texturization is preferred because it generally provides a texturized yarn having fewer fiber segments and more fiber loops than does yarn texturized by the mechanical technique. A suitable air jet texturizing machine for this purpose is available under the trade designation MODEL 17 SIDEWINDER from Enterprise Machine and Development Corporation of New Castle, Del. Preferably, the texturized inorganic yarn has a diameter in the range from about 1 to about 10 mm. More preferably, the diameter of the texturized inorganic yarn is in the range from about 3 to about 6 mm.

The inorganic fibers which comprise the inorganic yarn preferably have a diameter in the range from about 5 to about 20 micrometers. More preferably, the inorganic fibers have a diameter in the range from about 7 to about 15 micrometers. Fibers having a diameter within the specified ranges generally are easier to make and texturize than are fibers having diameters substantially outside of these ranges. Further, fibers substantially below 5 micrometers in diameter tend to be easily damaged (i.e., broken when texturized). Fibers substantially above 25 micrometers in diameter typically provide a filter which is less efficient than do fibers having diameters within the specified ranges.

The inorganic fibers comprising the inorganic yarn are preferably heat resistant. The heat resistant fibers can be, for example, amorphous, polycrystalline, or a combination thereof. Useful heat resistant fibers include special high temperature glass fibers, such as S2 GLASS or E GLASS, commercially available from Owens-Corning of Toledo, Ohio; continuous fused silica fibers, such as QUARTZEL™ fused quartz yarn, commercially available from Quartz Products Corporation of Louisville, Ky.; and fibers of ceramic metal oxides such as NEXTEL™ 312, 440 or 550 ceramic fibers, commercially available from 3M Company of St. Paul, Minn. Knitted, woven or braided fabrics made from blends of the glass and ceramic yarns could also be used. For applications below approximately 330° C., conventional glass fibers could be used.

Preferably, the inorganic material comprising the inorganic yarn of the filtering element 44 and the inorganic material comprising the formed textile 42 of the support tube 40 are the same inorganic material. By constructing the support tube 40 and the filtering element 44 from the same inorganic material, the thermal expansion and contraction rates of the support tube 40 and filtering element 44 are the same. The matching rates of thermal expansion and contraction between the support tube 40 and the filtering element 44 allow uniform expansion and contraction throughout the filter assembly 20, thereby preventing the filtering element 44 from loosening on the support tube 40. For example, if the rate of thermal expansion was greater for the material comprising the filtering element 44 than the ram of thermal expansion for the material comprising the support tube 40, during regeneration the filtering element 44 would expand faster than the support tube 40 and thereby cause the filtering element 44 to loosen on the support tube 40. Possible effects of the non-uniform thermal expansion of the support tube 40 and the filtering element 44 include decreased filtering performance over time and a decrease in the useful life of the filter assembly 20.

For enhanced filtering efficiency, inorganic yarn is preferably substantially helically wound or cross-wound around the support tube 40 as described above. The inorganic yarn may be wound about the support tube 40 such that the cores of the successive convolutions of each successive layer are radially aligned (as described in U.S. Pat. No. 5,248,482), or the inorganic yarn may be wound about the support tube 40 such that the cores of successive convolutions of successive layers are laterally offset from each other (as described in U.S. Pat. No. 5,248,481).

In alternative embodiments, the filtering element 44 may comprise a non-woven material or a flat style fabric. Suitable non-woven mats are commercially available, and include SAFFIL LD MAP™ from Imperical Chemicals, Inc. of Cheshire, United Kingdom and FIBERMAX™ from Carborundum Company of Niagara Falls, N.Y. Suitable non-woven mats of chopped NEXTEL™ ceramic oxide fibers can be prepared in the manner described in commonly assigned, U.S. application Ser. No. 08/176,329 by Erickson et al. filed on Jan. 3, 1994. Suitable fibers for making filter fabric are commercially available under the NEXTEL™ from the 3M Company of St. Paul, Minn.

For a filtering element 44 comprising a non-woven mat, the mat preferably is selected to allow a high degree of filtering efficiency without significant back pressure. A preferred non-woven mat comprises chopped ceramic oxide fibers. Preferably, the ceramic fibers are made of alumina-boria-silica, alumina, silica, silicon carbide, or zirconia. More preferably, the non-woven mat comprises alumina-boria-silica chopped fibers. As noted above, the material comprising the filtering element 44 preferably has a thermal expansion and contraction rate similar to the thermal expansion and contraction rate of the support tube 40.

The relative fineness and inherent large surface area of a non-woven mat as compared to yarns of inorganic fiber, allows a filtering element 44 comprising a non-woven mat to be thinner while having the same filtering efficiency as a filter element which uses a texturized yarn of inorganic fibers. A filtering element comprising substantially helically wound or cross-wound texturized yarn of inorganic fibers, however, may be more economical to produce than one incorporating one or more layers of a non-woven mat.

Preferably, each filtering element has a thickness in the range from about 1 to 25 mm. For filtering elements comprising substantially helically wound or cross-wound, texturized yarn comprising inorganic fibers, the preferred total thickness of the wound or cross-wound fibers is in the range from about 5 to about 15 mm. Thicknesses substantially greater than the stated ranges may unduly increase cost and may also result in undesirably high back pressures, whereas thicknesses substantially smaller than the stated ranges may provide inadequate filtering efficiency.

Each filtering element 44 can alternatively comprise one or more layers of more than one type of filtering material. For example, the filtering element 44 can comprise one or more layers of substantially helically wound or cross-wound inorganic yarn, or it can comprise one or more layers of non-woven mats comprising inorganic fibers, wherein the mat is held against the support tube 40 by substantially helically wound or cross-wound inorganic yarn (FIG. 6). Alternatively, a non-woven mat filtering element 44 may be held against the support tube 40 by outer sleeve 46.

The following examples are provided to illustrate presently contemplated preferred embodiments and the best mode for practicing the invention, but are not intended to be limiting thereof.

EXAMPLES

Preparation of a Diesel Cartridge

A particulate assembly substantially as illustrated in FIGS. 2 and 3 was constructed. A support tube was formed from NEXTEL™ 312, 2/4, 1800 Denier fiber braided into a tube with a 1.75 inch (4.45 cm) outer diameter. The support tube was made less flexible by dipping the support tube into a colloidal silica solution (NALCO 2327, available from Nalco Inc. of Chicago, Ill.) and heating the dipped support tube to dry the colloidal silica. A filtering element consisting of four concentric layers of NEXTEL™ fabric was then wrapped around the dried support tube. The four layers alternate between a fabric with a 6×7 "pic" per inch (2.36× 2.75 pic/cm) construction (6 "pic" per inch (2.36 pic/cm) texturized fiber in the axial direction, 7 "pic" per inch (2.75 pic/cm) non-texturized fiber in the radial direction), and a 15×7 "pic" per inch (5.9×2.75 pic/cm) fabric (7 "pic" per inch (2.75 pic/cm) non-texturized yarn in the axial direction, 15 "pic" per inch (5.9 pic/cm) texturized yarn in the radial direction). All 7 "pic" per inch (2.75 pic/cm) yarn material was based upon NEXTEL™ 312, 1800 Denier, 2/3 construction, with a 2.7 Z twist per inch (1.06 twist/cm). The texturized yarns were based on NEXTEL™ 312, 1800 Denier, 2/2 construction, 1.5 Z twist per inch (0.59 twist/era). After the fabric media was wrapped onto the support tube, the assembly of the tube and filtration media was covered with a NEXTEL™ braided sleeving. The ends of the package were then dipped into the same NALCO 2327 colloidal silica solution as was applied to the support tube. The assembly of support tube, filtering element, and outer sleeve were fitted into end cap fixtures. The end caps were formed from 304 stainless steel. The slotted outer walls of the end caps were crimped radially inward to attach them to the filter assembly. The cartridge was then heated to 600° C. to dry the colloidal silica dipped ends into place. The characteristics of the formed fabric used in the support tube and the outer sleeve are found in TABLE 1.

TABLE 1

|  | Support Tube | Outer Sleeve |
| --- | --- | --- |
| Braid | Two Over Two Under | Two Over Two Under |
| Inside Diameter | 1¾ Inches (4.45 cm) ASTM D 350 | 2½ Inches (6.35 cm) +/− 15% ASTM D581 |
| Yarn | Nextel ™ 312 2/4, 4.0 twist/inch (1.57 twist/cm) 1800 Denier | Nextel ™ 312 2/2, 4.0 twist/inch (1.57 twist/cm) 1800 Denier |
| Weight | (On Mandrel) 1.9 yds/lb (4.2 m/kg) +/− 15% ASTM D581 (Yield as Packaged) 3.2 yds/lb (6.4 m/kg) +/− 15% | (On Mandrel) 4.5 yds/lb (9.9 m/kg) +/− 15% ASTM D581 (Yield as Packaged) 7.2 yds/lb (14.5 m/kg) +/− 15% |
| Thickness | .085 inches +/− .005 (2.16 mm +/− 0.127) ASTM D1777 | .052 Inches +/− .005 (2.16 mm +/− 0.127) ASTM D1777 |
| Number of Carries | 80 | 80 |
| Ends/Carrier | 1 | 1 |
| Pics/Count | 7.6 +/− 2 pics/inch (3 +/− 0.78 pics/cm) ASTM D581 | 10 +/− 2 pics/inch (3.9 +/− 0.78 pics/cm) ASTM D581 |

EXAMPLE 1

This Example illustrates the filtering efficiency of the filter of the present invention.

Two filter assemblies of the construction described above (in Preparation of a Diesel Cartridge) were subjected to an engine test procedure. The engine used for this test was a 3.4 liter, six cylinder, four stroke diesel engine commercially available under the trade designation "CUMMINGS 6A 3.4 DIESEL ENGINE" from Cummings Engine Company of Columbus, Ind.). The engine was connected to a conventional variable load hydraulic pump to dissipate the power from the engine. The hydraulic load bank was attached to the torque shaft of the engine and maintained at a pressure of 1200 psi (8274 kPa) throughout the test to provide a controlled load on the engine. The two filter assemblies were mounted in a single casing, which was then mounted to the engine's 3 inch (7.6 cm) diameter stainless steel exhaust system. The exhaust system was equipped with a calibrated orifice that allowed for directing a desired amount of the total exhaust flow from the engine through the casing containing the filtration cartridges. The engine was run at approximately 1200 rpm with an exhaust flow rate of about 35 cfm (cubic feet per minute) (59 Nm$^3$/hr, i.e., normalized cubic meters per hour).

Data gathered during testing included: filtration efficiencies, time to different back pressure levels, and soot holding weights. The filtration efficiencies were measured by a "raw gas sampling" method which involves pulling a metered amount of exhaust gas through a 90 mm Pallflex membrane filter. This is done simultaneously upstream and downstream of the filtration cartridges. The mass concentration of the downstream raw gas sample is then divided by that of the upstream sample, subtracted from unity and multiplied by 100 percent. The resulting figure indicates the percent reduction in soot concentration achieved by the filter. The test was run until the back pressure of the casing containing the two filtration cartridges reached 60 inches (152 cm) of water. The elapsed time and filtration efficiency was recorded every 10 inches (25.4 cm) of water. The cartridges were then removed from the casing, allowed to cool to room temperature, and weighed. The weight was then subtracted from the initial weight, thereby indicating the amount of soot particulate collected during the test. The amount of soot collected on a cartridge where the backpressure was 60 inches (152 cm) of water was 1.7 grams. The collected data is listed in Table 2.

TABLE 2

| Backpressure Level | | Filtration Efficiency (% reduction in soot concentration) | Elapsed Time (minutes) |
| --- | --- | --- | --- |
| (cm of H$_2$O) | (inches of H$_2$O) | | |
| 25.4 cm | 10" | 68 | 23 |
| 50.8 cm | 20" | 67 | 46 |
| 76.2 cm | 30" | 67 | 68 |
| 101.6 cm | 40" | 71 | 90 |
| 127 cm | 50" | 68 | 110 |
| 152.4 cm | 60" | 67 | 132 |

EXAMPLE 2

This example shows that microwave energy can be used to regenerate a diesel cartridge of the present invention.

Two cartridges were assembled as described above (in Preparation of a Diesel Canridge) except that the ends of the cartridge were not dipped in colloidal silica and a conventional metal end cap secured with a band clamp was mounted on the end of the cartridge. A conventional cap, rather than one with slotted outer walls which are crimped, was used so that the end caps could be easily removed for testing the filtration media in a microwave oven.

The canridges were mounted in a casing as depicted in FIG. 1. The conical inlet of the casing was connected to the exhaust system of the engine and load bank described in Example 1 above. The engine and load bank were operated at the same condition as described in Example 1.

The engine was operated until the backpressure drop across each diesel filter cartridge was 60 inches (152 cm) of water. The time to develop this backpressure was 100 minutes.

One of the cartridges was tested for regeneration using microwave energy. The canridge was removed from the casing and the end caps were removed. A cartridge was placed into a 1300 Watt multimode microwave oven (commercially available from Microwave Materials Technologies, Inc., Model 10-1300 2.45 GHz, 1300 Watt).

To monitor the temperature in the cartridge during microwave regeneration, one thermocouple was inserted through the wall of the filter media and one thermocouple was inserted down the long axis. The output on the oven was set at 83%, corresponding to a power level between 550 and 600 Watts. During regeneration, portions of the filter glowed red. After being subjected to the microwave energy for 8 minutes, all but the edges of the cartridge glowed red. The axially oriented thermocouple read 419° C. and the radially inserted thermocouple read 523° C. At the beginning of the test, the filter media was substantially black in color due to the collection of soot. After heating in the microwave oven, the color of the filter media was substantially white. The regenerated cartridge weighed 223.00 grams; the soot-loaded cartridge weighed 224.83 grams. Thus the amount of soot burned away during regeneration was 1.83 grams.

Although the present invention has been described with reference to preferred embodiments, workers skilled in the art will recognize that changes may be made in form and detail without departing from the spirit and scope of the invention.

What is claimed is:

1. A method for maintaining a clean gas stream comprising:

providing at least one self-supporting support tube, the support tube consisting solely of a substantially rigidized formed textile constructed of a continuous filament inorganic yarn, the formed textile being porous to permit a gas stream and particulates therein to pass through the support tube;

disposing a filtering element about the support tube, the filtering element having a plurality of intermeshed fiber loops or fiber segments to trap particulates in the gas stream;

passing a gas stream with particulates therein through the support tube and filtering element, the filtering element trapping the particulates and removing the particulates from the gas stream; and heating the support tube, filtering element and trapped particulates to ignite and burn the particulates to regenerate the filtering element when the trapped particulates have diminished the effectiveness of the filtering element to a predetermined level.

2. The method of claim 1, wherein the support tube, filtering element and trapped particulates are heated by microwave energy.

3. The method of claim 1, wherein the support tube, filtering element and trapped particulates are heated by an electrically resistive element.

4. The method of claim 1, wherein the support tube, filtering element and trapped particulates are heated by a fuel burner.

5. The method of claim 1, wherein the support tube, filtering element and trapped particulates are heated by a catalytic fuel additive.

6. The method of claim 1, wherein the support tube and the filtering element are formed from the same inorganic material, such that the support tube and the filtering element have the same thermal expansion and contraction characteristics.

7. The method of claim 1, wherein the filtering element comprises:

a continuous filament inorganic ceramic yarn substantially helically cross-wound around the support tube, the ceramic yarn defined by a core from which a plurality of loops of continuous fibers or fiber segments extend outwardly, wherein successive convolutions of the ceramic yarn are oppositely wound in each layer to provide interwoven cores, the cores of successive convolutions of each successive layer radially aligned to provide walls that are spaced to define openings, with at least one of the loops of fiber or fiber segments of adjacent convolutions being intermeshed to provide a trap for exhaust particulates.

8. The method of claim 1, wherein the filtering element comprises:

a continuous filament inorganic yarn substantially helically cross-wound around the support tube to form a plurality of layers of yarn, the yarn having a core from which a plurality of loops of continuous fibers or fiber segments extend outwardly, wherein successive convolutions are oppositely wound in each layer to provide interwoven cores, cores of successive convolutions of each successive layer being spaced to define four-sided openings, wherein the loops of fibers or fiber segments project into each of the four-sided openings to provide a trap for diesel exhaust particulates, cores of convolutions of at least one layer being laterally offset from cores of convolutions of an adjacent layer to deflect into tortuous paths exhaust gases flowing generally radially through the filter assembly.

9. A diesel exhaust particulate filter comprising:

an elongated rigidized support tube having an interior surface and an exterior surface, the support tube defined solely by a formed textile constructed from a continuous filament inorganic yarn, the formed textile being porous to permit an exhaust gas and particulates therein to pass through the support tube; and a filtering element disposed on at least one surface of the support tube, the filtering element formed to trap particulates in the exhaust gas.

10. A particulate filter of claim 9, wherein the support tube is substantially rigidized by the application of an inorganic binder.

11. The particulate filter of claim 10, wherein the inorganic binder is a colloidal silica solution.

12. The particulate filter of claim 9, wherein the filtering element disposed on the support tube comprises an inorganic non-woven material.

13. The particulate filter of claim 9, wherein the filtering element disposed on the support tube comprises an inorganic woven fabric.

14. The particulate filter of claim 9, wherein the filtering element disposed on the support tube comprises a texturized inorganic yarn helically wound about the support tube.

15. The particulate filter of claim 9, wherein the filtering element comprises layers of inorganic filtering materials selected from the group consisting of alumina-boria-silica, alumina-silica, alumina, and zirconia.

16. The particulate filter of claim 9, wherein the filtering element comprises layers of at least one inorganic filtering material selected from the group consisting of non-woven fibers, woven fabric, and texturized yarn.

17. The particulate filter of claim 9, wherein the support tube and the filtering element are each formed from the same inorganic material.

18. A hot gas filter assembly comprising:

a self-supporting elongated support tube constructed solely from continuous filament inorganic yarns creating a formed textile, the formed textile being porous to substantially permit an exhaust gas and particles therein to pass through the support tube;

a filtering element disposed about the support tube for trapping particulates in the exhaust gas; and a porous sleeve formed of an inorganic material and shaped to cover the filtering element on the support tube.

19. An exhaust gas particulate filter assembly comprising:

a casing having two ends;

means for connecting the ends of the casing to an exhaust system;

a self-supporting longitudinal support tube extending between the ends of the casing, the support tube defined solely by a substantially rigidized formed textile constructed of a continuous filament inorganic yarn, the formed textile being porous to permit an exhaust gas and particulates therein to pass through the support tube; and an inorganic filtering element disposed about the length of the support tube for trapping particulates in the exhaust gas.

20. The filter assembly of claim 19, further comprising an end cap for securing the support tube and filtering element between the ends of the casing, and for directing the exhaust gas and particulates therein through the filtering element.

21. The filter assembly of claim 20, wherein the end cap comprises a first collar coaxially aligned with a second collar, the first collar and the second collar secured to a base plate mounted within the casing, such that the first collar is positioned within the second collar, the second collar having a plurality of tabs positioned about its circumference, the tabs extending in the axial direction of the collar, the space between the first collar and the second collar defining a recess, the recess of size sufficient to allow insertion of an open end of the support tube and filtering element disposed thereon into the recess, the support tube and filtering element secured within the recess by deforming the tabs on the second collar toward the first collar, thereby clamping the support tube and filtering element between the first collar and the second collar.

22. The filter assembly of claim 20, wherein the end cap includes an orifice to allow exhaust gases through the end cap.

23. The filter assembly of claim 19, wherein the filtering element comprises:

continuous filament inorganic yarn substantially helically cross-wound around the support tube, wherein the yarn has a core from which a plurality of loops of continuous fibers or fiber segments extend outwardly, wherein successive convolutions are oppositely wound in each layer to provide interwoven cores, cores of successive convolutions of each successive layer radially aligned to provide walls that are spaced to define four sided openings, the walls providing stabilization to the filtering element against exhaust forces, wherein the loops of fibers or fiber segments project into each of the four-sided openings, with at least one of the loops of fibers or fiber segments of adjacent convolutions being intermeshed to provide a trap for diesel exhaust particulates.

24. The filter assembly of claim 19, wherein the filtering element comprises:

a continuous filament inorganic yarn substantially helically cross-wound around the support tube to form a plurality of layers of yarn, the yarn having a core from which a plurality of loops of continuous fibers or fiber segments extend outwardly, wherein successive convolutions are oppositely wound in each layer to provide interwoven cores, cores of successive convolutions of each successive layer being spaced to define four-sided openings, wherein the loops of fibers or fiber segments project into each of the four-sided openings to provide a trap for diesel exhaust particulates, cores of convolutions of at least one layer being laterally offset from cores of convolutions of an adjacent layer to deflect into tortuous paths exhaust gases flowing generally radially through the filter assembly.

25. The filter assembly of claim 19, wherein the filtering element comprises a non-woven inorganic material.

26. The filter assembly of claim 19, wherein the filtering element comprises a woven inorganic fabric.

27. An end cap for use with a filtering assembly for filtering a particulate bearing gas, the filtering assembly having at least one open end, the end cap comprising a first collar coaxially aligned with a second collar, the first collar and the second collar secured to a base plate such that the first collar is positioned within the second collar, the second collar having a plurality of tabs positioned about its circumference, the tabs extending in the axial direction of the collar, the space between the first collar and the second collar defining a recess, the recess of size sufficient to allow insertion of an open end of the filter assembly into the recess, the filter assembly secured within the recess by deforming the tabs on the second collar toward the first collar, thereby clamping the filter assembly between the first collar and the second collar.

28. The end cap of claim 27, wherein the base plate includes at least one orifice to allow exhaust gases to pass through the base plate.

29. The end cap of claim 27, wherein the end cap further comprises means for mounting the end cap and filter assembly within an exhaust system.

30. A method of making a cartridge that is useful in a diesel exhaust particulate filter, a method comprising the steps of:

providing an elongated support tube having an interior surface and an exterior surface, the support tube defined solely by a formed textile constructed from a continuous filament inorganic yarn, the formed textile being porous to permit an exhaust gas and particulates therein to pass through the support tube; and wrapping a filtering element about the exterior surface of the support tube, the filtering element formed to trap particulates in the exhaust gas.

31. The method of claim 30 wherein the filtering element comprises:

continuous filament inorganic yarn substantially helically cross-wound around the support tube, wherein the yarn has a core from which a plurality of loops of continuous fibers or fiber segments extend outwardly, wherein successive convolutions are oppositely wound in each layer to provide interwoven cores, cores of successive convolutions of each successive layer radially aligned to provide walls that are spaced to define four sided openings, the walls providing stabilization to the filtering element against exhaust forces, wherein the loops of fibers or fiber segments project into each of the four-sided openings, with at least one of the loops of fibers or fiber segments of adjacent convolutions being intermeshed to provide a trap for diesel exhaust particulates.

32. The method of claim 30 wherein the filtering element comprises:

a continuous filament inorganic yarn substantially helically cross-wound around the support tube to form a plurality of layers of yarn, the yarn having a core from which a plurality of loops of continuous fibers or fiber segments extend outwardly, wherein successive convolutions are oppositely wound in each layer to provide interwoven cores, cores of successive convolutions of each successive layer being spaced to define four-sided openings, wherein the loops of fibers or fiber segments project into each of the four-sided openings to provide a trap for diesel exhaust particulates, cores of convolutions of at least one layer being laterally offset from cores of convolutions of an adjacent layer to deflect into tortuous paths exhaust gases flowing generally radially through the filter assembly.

* * * * *

UNITED STATES PATENT AND TRADEMARK OFFICE
CERTIFICATE OF CORRECTION

PATENT NO.: 5,453,116

DATED: September 26, 1995

INVENTOR(S): Edward M. Fischer et al.

It is certified that error appears in the above-identified patent and that said Letters Patent is hereby corrected as shown below:

```
Col. 3, line 56, "bum" should read --burn--.
Col. 8, line 46, "ram" should read --rate--.
Col. 9, line 1,  "MAP™" should read --MAT™--.
```

Signed and Sealed this

Twenty-second Day of October, 1996

Attest:

BRUCE LEHMAN

Attesting Officer

Commissioner of Patents and Trademarks